Patented Nov. 24, 1953

2,660,595

UNITED STATES PATENT OFFICE 2,660,595

STABLE LEAD ALKYL COMPOSITIONS AND A METHOD FOR PREPARING THE SAME

George Calingaert, Geneva, N. Y., assignor to Ethyl Corporation, New York, N. Y., a corporation of Delaware No Drawing. Application March 24, 1952, Serial No. 278,294

23 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally my invention contemplates inhibiting the thermal decomposition of alkyllead compounds in which at least one valence of the lead is satisfied by an alkyl radical.

More specifically, my invention is concerned with an improved process for separating alkyllead compounds from the reaction products accompanying their synthesis. It is also applicable to a method for inhibiting thermal decomposition of an alkyllead product during its formation or during any step of the process including blending with other products in making the commercial antiknock fluid. It is applicable to minimizing the possibility of thermal decomposition during storage or transportation of an alkyllead product. It is especially applicable to preventing thermal decomposition of mixtures containing a high concentration of an alkyllead compound. The likelihood of thermal decomposition is more of a problem at high concentrations of lead alkyls, i. e., compositions above 80% by weight.

As is well known, tetraalkyllead antiknock compounds generally are produced by reacting an alloy of lead and a dissimilar metal usually sodium, with an alkylating agent such as alkyl halide, usually an alkyl chloride. The tetraalkyllead compound is produced thereby in admixture with various reaction by-products from which it must be separated. Separation is accomplished ordinarily by steam or vacuum distillation with subsequent purification of the tetraalkyllead distillate. Due to the toxic and unstable nature of tetraalkyllead antiknock compounds, the foregoing process is subject to many difficulties.

In the manufacturing operations of alkyllead compounds meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 per cent per hour at a temperature of 100° C., which is the customary temperature used in separating tetraethyllead from the reaction products accompanying its synthesis. At temperatures above 100° C. the decomposition rate increases logarithmically so that a point is soon reached where external heat is no longer required and decomposition becomes self-propagating.

Generally the manufacture of a tetraalkyllead, for example, tetraethyllead, involves the following steps: reaction, separation from reaction products, purification and blending. The reaction and separation steps of the alkyllead process which are conducted at or near decomposition temperatures require extensive and careful precautionary measures in order to minimize, and to provide for, excessive decomposition due to sudden and unavoidable increases in temperature.

Such likelihood of excessive decomposition is present also during blending, handling, storage and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

Therefore, it is an object of my invention to stabilize alkyllead compounds in which at least one valence of the lead is satisfied by an alkyl radical, against thermal decomposition during one or more of the following operations: manufacture, purification, blending, transportation and storage.

I accomplish this object by incorporating with alkyllead compounds a relatively small quantity of a material which I have found has the property of inhibiting and substantially preventing their decomposition when subjected to elevated temperature conditions. Furthermore, I accomplish this object by conducting one or more steps of the manufacturing process for the alkyllead compound, particularly the separation step, in the presence of such a material. The materials which I have found to possess this property are referred to hereinafter as "thermal stabilizers."

These thermal stabilizers are various different types of compounds. Fused-ring hydrocarbons and halogenated derivatives of these hydrocarbons are particularly effective, as well as unsaturated compounds having boiling points at least as high as 1° C. at atmospheric pressure. Of these unsaturated compounds best results are obtained when they are olefin hydrocarbons including aryl-substituted olefins. The substitution of halogens for part or all of the hydrogen atoms in such unsaturated compounds also gives highly effective thermal stabilizers.

Aliphatic nitro compounds, as well as aliphatic nitrates and aliphatic nitrites, form another very effective class of thermal stabilizers according to the present invention.

Compounds that have a boiling point below 1° C. at atmospheric pressure are of no appreciable value as thermal stabilizers. It appears that such compounds in addition to their low effectiveness are substantially insoluble in the alkyllead compounds to be stabilized, and can accordingly not be mixed with these compounds in the desired proportions.

I have found that my thermal stabilizers when used in amounts varying from 0.01 to 5.0 per cent by weight of the lead alkyl product are effective in substantially retarding or preventing thermal decomposition at temperatures above 100° C. for an extended period of time, e. g., ten to twenty hours at 130° C., which period is sufficient for all contemplated commercial applications.

A representative group of my thermal stabilizers are the following: crotonaldehyde, alloocimene, butadiene, diamylene, dipentene, heptene, trimethylethylene, styrene, divinylbenzene, cyclohexene, dicyclopentadiene, allyl iodide, chloroprene, hexachloropropylene, ethynylcyclohexanol, glyceryl monostearate, glycol dilaurate, tiglic alcohol, alloxan, azobenzene, 2,2'-azonaphthalene, 4-benzeneazo-1-naphthylamine, n-butyl nitrate, triphenylchlormethane, n-butyl nitrite, nitroethane, nitromethane, 2-nitro-2-methyl-1-propanol, p-nitrobenzoic acid, p-nitroaniline, allyl isothiocyanate, anthracene, chrysene, naphthalene, alpha-methyl naphthalene, alpha-bromonaphthalene, chloronaphthalene, alpha-naphthol, beta-naphthol, naphthoresorcinol, beta-naphthoquinoline, tetrahydronaphthalene, indene, stearyl iodide, styrene dibromide, phloroglucinol, di-isobutylene, tetramethylethylene, tribromoethylene, oleic acid, cinnamic acid dibromide, maleic anhydride, phthalic anhydride, aluminum oleate, ethyl thiocyanate, hexachloroethane, 2-amino-2-methyl-1-propanol, 2-ethyl-1,3-hexanediol, iodoform, furfural, chlorophyll, lecithin, pyrophosphaditic acid, semi-carbazide hydrochloride, stilbene, methyl styrene, o-bromohydrostyrene, p-chlorostyrene, o-ethylstyrene, o-chlorostyrene, aconitic acid, ethylene dibromide, resorcinol, 2,4,6-tri(dimethylaminomethyl)phenol, 2-methyl-2,4-pentanediol, ethylene bromohydrin, alpha-terpineol, acetyl aminothiophene, ethanolamine, p,p'-diaminodiphenylmethane, acridine, furfuryl alcohol, furfuryl amine, 8-hydroxyquinaldine, lepidine. Of these compounds the butadiene has the lowest boiling point, its boiling point being about 1° C. at atmospheric pressure.

To illustrate the surprising nature of my invention I mixed 0.03 per cent by weight of styrene with 50 gallons of tetraethyllead. Thereafter I heated the resulting mixture first to 100° C., then progressively to 130° C. No decomposition took place, so I maintained this temperature for a period of 25 hours and still substantially no decomposition took place. In contrast, when I heated tetraethyllead without a stabilizer under the same conditions, it was not possible to heat the mass progressively to 130° C. By the time that temperature was reached, vigorous decomposition was underway causing the temperature to rise very rapidly and resulting in complete decomposition of the tetraethyllead in a matter of minutes. Similarly substantially no decomposition of tetraethyllead occurred when 0.5 per cent by weight of naphthalene or 0.4 per cent by weight of divinyl benzene was incorporated therewith.

In another example triethyllead bromide was heated to a temperature of 160° C. and it substantially completely decomposed within two hours. However when it was heated to the same temperature in the presence of two per cent by weight of naphthalene, little decomposition occurred within five hours.

Similarly, tetrapropyllead which decomposed completely within twenty minutes at temperatures of 160° C., did not decompose to any appreciable extent for a period of two hours at that temperature in the presence of two per cent by weight of styrene.

As a further illustration of the surprising nature of my invention I have been able to boil tetraethyllead at atmospheric pressure in the presence of one of my thermal stabilizers, for example in the presence of less than five per cent by weight of bromostyrene, without decomposition and I have determined its boiling point to be approximately 198° C. Heretofore, the atmospheric boiling point of tetraethyllead had not been definitely known since decomposition invariably occurred before this temperature could be reached. As a result it was always necessary either to estimate its atmospheric boiling point or give its boiling point only at reduced pressure, not higher than 20 millimeters of mercury absolute if the results are to be at all accurate. The boiling points heretofore unknown of other alkyllead compounds can be determined similarly. The practical application of this phenomena is that tetraethyllead may be separated from its reaction products by distillation at atmospheric pressure without the use of steam.

My invention is adapted to the stabilization of tetraethyllead and other alkyllead compounds at various stages during synthesis, separation, purification and blending with other materials. For example one of my thermal stabilizers may be added to the reactants whereby the alkyllead compound is produced, regardless of the particular reaction employed. Preferably it is added prior to the separation step which is conducted at a temperature close to the temperature where hazardous run-away decomposition is particularly prevalent. By adding one of my thermal stabilizers to the reaction mixture prior to distillation, the danger arising from unexpected temperature increases is substantially eliminated.

Also my thermal stabilizers may be employed to stabilize the alkyllead compound both in storage and in shipping and especially to stabilize any alkyllead concentrate. If elevated temperature conditions are likely to be encountered, the addition of a small amount of thermal stabilizer to the alkyllead compound will economically and satisfactorily eliminate most of the hazard involved. While meticulous temperature control and exacting safety measures have been successful in reducing to a minimum the hazards of processing and handling of tetraethyllead, the use of my invention provides a factor of safety far beyond that presently enjoyed. Furthermore, waste of the alkyllead product due to decomposition is considerably minimized through the use of my invention.

My invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead and triethyllead bromide can be successfully stabilized against thermal decomposition by incorporating therein a relatively small quantity of one of my stabilizers.

The effectiveness of my stabilizers varies with the stabilizer used and with the compound to be stabilized. The relative effectiveness of my stabilizers can be readily determined by mixing one or two per cent by weight with a small amount of the alkyllead compound and heating the mixture for an extended period of time at a constant temperature, for example, 160° C. when tetraethyllead is the alkyllead compound. The gases produced by decomposition may be collected and measured. The rate of gas formation provides an accurate indication of the relative effectiveness of a given stabilizer for preventing thermal decomposition of a given alkyllead compound.

Depending upon the conditions to which said alkyllead compound is subjected or likely to be subjected, the stabilizer should be stable to oxidation, it should be non-polymerizable at the temperature of reaction of the alkyllead compound, it should be non-objectionable as contained in the final product, and if it is desired to distill the stabilized material, the stabilizer should have a vapor pressure within the range of the alkyllead product. Besides relative effectiveness, generally all the above properties should be taken into account in selecting the best commerical stabilizer for a given alkyllead compound.

As many apparently widely different embodiments of this invention may be made without departing from the spirit and scope hereof, it is to be understood that the invention is not limited to the specific embodiments hereof, except as defined in the appended claims.

This application is a continuation-in-part of my copending application, Serial Number 64,259, filed December 8, 1948.

What is claimed is:

1. A method of inhibiting the decomposition of an alkyllead compound comprising incorporating therewith a thermal stabilizer selected from the class consisting of allo-ocimene, butadiene, diamylene, dipentene, heptene, trimethylethylene, cyclohexene, dicyclopentadiene, allyl iodide, chloroprene, hexachloropropylene, di-isobutylene, tetramethylethylene and tribromoethylene.

2. A method of inhibiting the decomposition of a tetraethyllead concentrate comprising incorporating therewith from 0.01 to 5.0 per cent by weight of a thermal stabilizer selected from the class consisting of allo-ocimene, butadiene, diamylene, dipentene, heptene, trimethylethylene, cyclohexene, dicyclopentadiene, allyl iodide, chloroprene, hexachloropropylene, di-isobutylene, tetramethylethylene and tribromoethylene.

3. In a process of producing tetraethyllead by reacting a sodium-lead alloy with ethyl chloride and separating the thus produced tetraethyllead from the reaction mass by steam distillation, the step which comprises conducting said steam distillation in the presence of a thermal stabilizer selected from the class consisting of allo-ocimene, butadiene, diamylene, dipentene, heptene, trimethylethylene, cyclohexene, dicyclopentadiene, allyl iodide, chloroprene, hexachloropropylene, diisobutylene, tetramethylethylene and tribromoethylene.

4. A new composition comprising an alkyllead compound and a thermal stabilizer selected from the class consisting of allo-ocimene, butadiene, diamylene, dipentene, heptene, trimethylethylene, cyclohexene, dicyclopentadiene, allyl iodide, chloroprene, hexachloropropylene, di-isobutylene, tetramethylethylene and tribromoethylene.

5. A new composition comprising at least eighty per cent by weight of tetraethyllead and less than five per cent of an organic thermal stabilizer selected from the class consisting of allo-ocimene, butadiene, diamylene, dipentene, heptene, trimethylethylene, cyclohexene, dicyclopentadiene, allyl iodide, chloroprene, hexachloropropylene, di-isobutylene, tetramethylethylene and tribromoethylene.

6. The process which comprises distilling an alkyllead compound at atmospheric pressure from a mixture containing said alkyllead compound and a stabilizer selected from the class consisting of allo-ocimene, butadiene, diamylene, dipentene, heptene, trimethylethylene, cyclohexene, dicyclopentadiene, allyl iodide, chloroprene, hexachloropropylene, di-isobutylene, tetramethylethylene and tribromoethylene.

7. In a process for steam distilling an alkyllead compound, the step of incorporating with said compound, before steam distillation, a thermal stabilizer selected from the class consisting of allo-ocimene, butadiene, diamylene, dipentene, heptene, trimethylethylene, cyclohexene, dicyclopentadiene, allyl iodide, chloroprene, hexachloropropylene, di-isobutylene, tetramethylethylene and tribromoethylene.

8. The method of claim 2 in which the stabilizer is dicyclopentadiene.

9. The method of claim 2 in which the stabilizer is hexachloropropylene.

10. The method of claim 2 in which the stabilizer is allo-ocimene.

11. The method of claim 2 in which the stabilizer is allyl iodide.

12. The method of claim 2 in which the stabilizer is chloroprene.

13. The process of claim 3 in which the stabilizer is dicyclopentadiene.

14. The process of claim 3 in which the stabilizer is hexachloropropylene.

15. The process of claim 3 in which the stabilizer is allo-ocimene.

16. The process of claim 3 in which the stabilizer is allyl iodide.

17. The process of claim 3 in which the stabilizer is chloroprene.

18. The composition of claim 5 in which the stabilizer is dicyclopentadiene.

19. The composition of claim 5 in which the stabilizer is hexachloropropylene.

20. The composition of claim 5 in which the stabilizer is allo-ocimene.

21. The composition of claim 5 in which the stabilizer is allyl iodide.

22. The composition of claim 5 in which the stabilizer is chloroprene.

23. In the manufacture of an alkyllead compound the improved recovery step comprising distilling the alkyllead compound at atmospheric pressure from a mixture containing said alkyllead compound and a thermal stabilizer in the proportion of from about 0.01 to 5.0 weight per cent of the alkyllead compound, the thermal stabilizer having a boiling point at least as high as 1° C. at atmospheric pressure and being selected from the group consisting of unsaturated acyclic hydrocarbons and halogen substituted unsaturated acyclic hydrocarbons, the halogen being selected from the group consisting of chlorine, bromine and iodine.

GEORGE CALINGAERT.

References Cited in the file of this patent

UNITED STATES PATENTS

| Number | Name | Date |
|---|---|---|
| 1,843,942 | Calcott et al. | Feb. 9, 1932 |
| 2,303,820 | Cantrell et al. | Dec. 1, 1942 |
| 2,432,321 | Linch | Dec. 9, 1947 |